Sept. 16, 1941.  H. N. LANDON  2,255,795
DEVICE FOR CONVERTING MULTIPHASE ALTERNATING CURRENT INTO DIRECT CURRENT
Filed Feb. 20, 1939  2 Sheets-Sheet 2
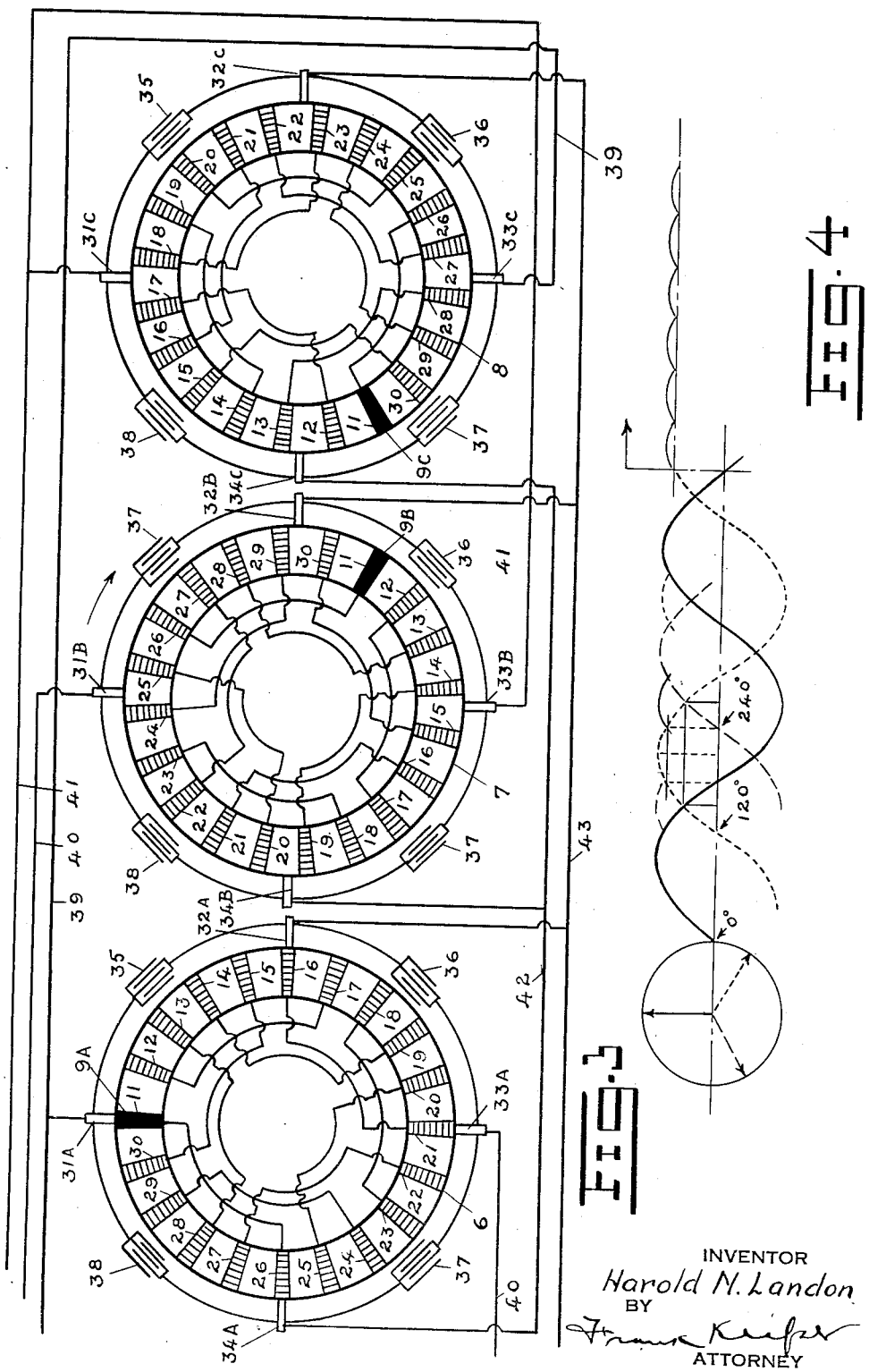
INVENTOR
Harold N. Landon
BY
ATTORNEY Patented Sept. 16, 1941

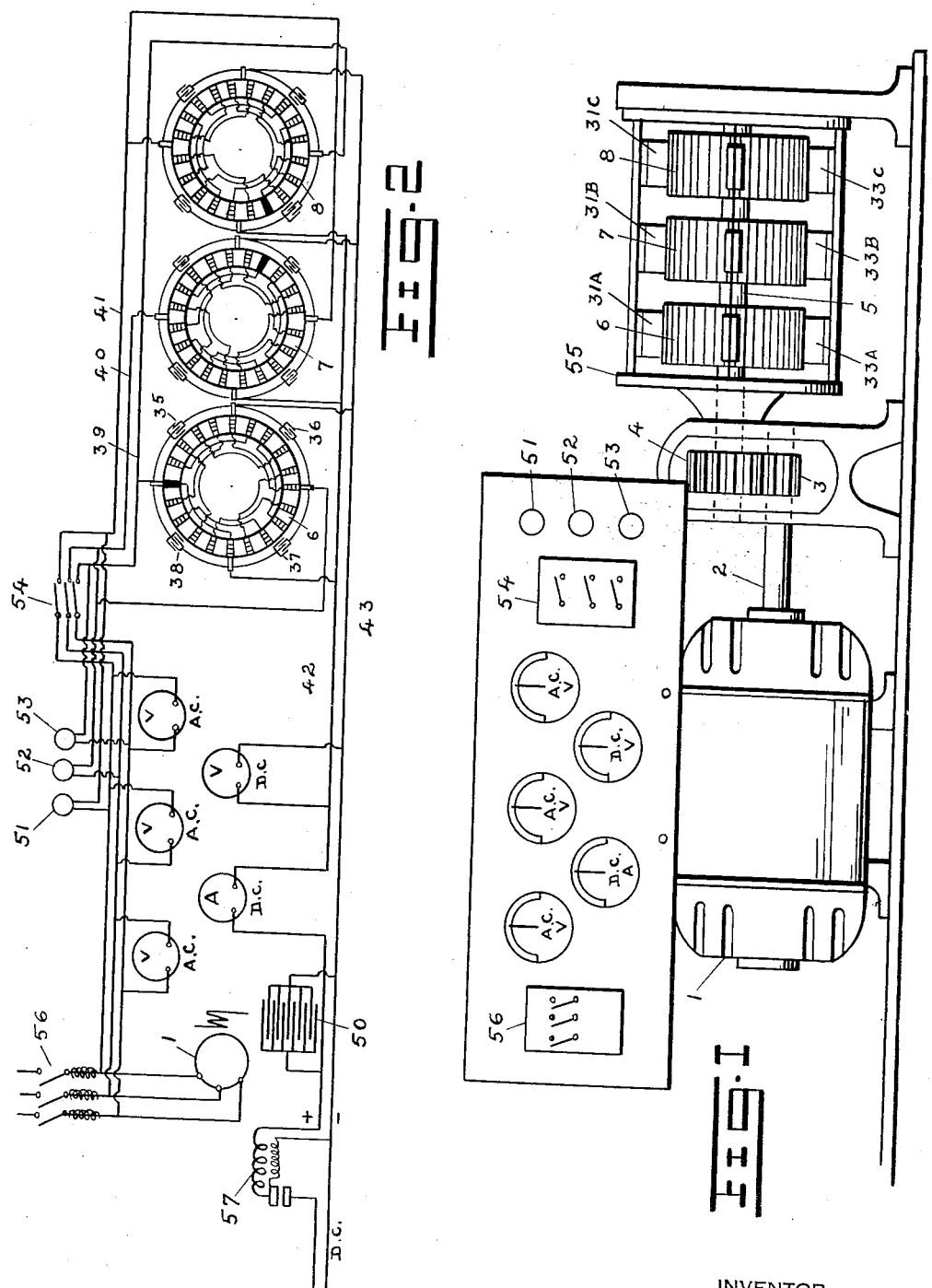

2,255,795

UNITED STATES PATENT OFFICE 2,255,795

DEVICE FOR CONVERTING MULTIPHASE ALTERNATING CURRENT INTO DIRECT CURRENT

Harold N. Landon, Glendale, Calif.

Application February 20, 1939, Serial No. 257,415

9 Claims. (Cl. 175—364)

The object of this invention is to provide a simple, cheap and effective converter for changing a three-phase current into a direct current.

Another object is to provide a device for converting multiphase alternating current of approximately the same undulatory wave as that produced by a direct current dynamo and said device is so made as to produce a two-wire direct current that draws equally from all phases of any multiphase circuit, thereby balancing the A. C. lines and using approximately 100% of that part of each current wave that has a mean average E. M. F. equal to or in excess of the required D. C. E. M. F.

Another object of the invention is to provide a converter having commutator bars separated by insulation that has an angular thickness two or more times as thick as the angular thickness of the commutator bars.

Another object of the invention is to limit the contact between the brushes and the live commutator bars to about one-third or less of the angular distance between centers of two consecutive live bars.

Another object of the invention is to provide a commutator with a large number of live bars thereon with a brush feeding alternating current to the live bars and a brush taking direct current off of the live bars, said brushes being spaced about 90 degrees apart.

Another object of the invention is to provide a commutator with a large number of live bars thereon, the even numbered bars being connected forward to the bars at 90 degrees therefrom, and the odd numbered bars being connected backward to the live bars at 90 degrees therefrom or vice versa.

Another object of the invention is to provide a condenser that is directly connected on one side to an alternating current brush, and on the other side to an adjacent direct current brush.

Another object of the invention is to provide a condenser that is directly connected on one side to an alternating current brush, and on the other side to an adjacent direct current brush, and to provide a capacitor connected across the direct current line, which capacitor is directly connected to the direct current side of the foregoing condensers.

Another object of the invention is to provide a series of commutators keyed to the same shaft, each of which has live bars, each commutator being keyed to the shaft in such position that the live bars on one commutator are a little in advance of the live bars on the next commutator.

Another object of the invention is to provide a commutator having a large number of live bars thereon, the angular distance between centers of three consecutive bars being equal to the angle through which the commutator must rotate while one complete sine curve is passing on the line.

Another object of the invention is to provide a commutator having an alternating current brush and a direct current brush making contact therewith, and a condenser that is directly connected on one side to the alternating current brush and on the other side to the direct current brush.

Another object of the invention is to provide a commutator having an alternating current brush and a direct current brush making contact therewith, and a condenser that is directly connected one one side to the alternating current brush and on the other side to the direct current brush, and provide a capacitor connected across the direct current line, which capacitor is directly connected to the direct current side of the foregoing condenser.

Another object of the invention is to provide a series of commutators, each of which has an alternating current brush and a direct current brush making contact therewith, and a condenser that is directly connected on one side to the alternating current brush and on the other side to the direct current brush, said commutators operating to convert a multiphase alternating current into a single direct current and provide a capacitor connected across the direct current line, which capacitor is directly connected to the direct current side of the foregoing condensers.

These and other objects of the invention will be illustrated in the drawings, described in the specification, and pointed out in the claims at the end thereof.

In the drawings:

Figure 1 is a side elevation of the assembly and switchboard.

Figure 2 is a diagrammatic view of the elements and the electrical connections therein.

Figure 3 is a diagrammatic view of the commutators shown in Figure 2, the showing being made on an enlarged scale.

Figure 4 is a diagrammatic view of the waves of electromotive force and that portion thereof that is converted from an alternating current to a direct current.

In the drawings like reference numerals indicate like parts.

In the drawings reference numeral 1 indicates an alternating current three-phase synchronous motor having a drive shaft 2. On the end of this drive shaft is a small pinion 3 which drives a large gear 4, the large gear having preferably five times as many teeth thereon as is on the pinion 3. This effects a reduction in angular velocity of five to one. The large gear 4 is carried on a shaft 5, on which is carried three commutators 6, 7, 8, which are all keyed to the same shaft in such manner that the phases of the alternating current are 120 degrees apart.

In Figures 2 and 3 I have shown a diagrammatic view of the commutators, the commutators being shown on a large scale in Figure 3. As shown in each of the three commutators in Figures 2 and 3, one of the commutator bars is shown solid black. These bars are referred to by the numerals 9A, 9B, and 9C. The commutators will all be carried on one shaft and will be keyed thereon, so that these three commutator bars are spaced 120 degrees apart, corresponding to the angular position of the three phases of a three-phase alternating current.

These commutator bars 9A, 9B and 9C may be taken as indicating the angular position of the commutators on the shaft. In each commutator there are twenty live bars and twenty dead bars. The commutator bars in each of the commutators will be numbered consecutively 11, 12, 13, 14, 15, 16, 17, 18, 19, 20, 21, 22, 23, 24, 25, 26, 27, 28, 29, 30. These bars are connected together in such manner that each odd numbered bar is cross connected to an even numbered bar spaced five bars therefrom, with the result that the rectified current flows in one direction from the odd numbered bars, and in the other direction from the even numbered bars.

In the commutator 9A the bar 11 is shown directly connected to the bar 26, the bar 12 is shown connected to the bar 17, the bar 13 is shown connected to the bar 28, the bar 14 is shown connected to the bar 19, the bar 15 is shown connected to the bar 30, the bar 16 is shown connected to the bar 21, the bar 17 is shown connected to the bar 12, the bar 18 is shown connected to the bar 23, the bar 19 is shown connected to the bar 14, the bar 20 is shown connected to the bar 25, the bar 21 is shown connected to the bar 16, the bar 22 is shown connected to the bar 27, the bar 23 is shown connected to the bar 18, the bar 24 is shown connected to the bar 29, etc.

On each commutator there are 20 live bars and four brushes making contact therewith. These brushes are spaced 90 degrees apart. These brushes are indicated by the reference numerals 31, 32, 33 and 34. The brushes 31 and 33 are spaced 180 degrees apart and deliver alternating current positive and negative waves in regular order to the commutator bars that pass thereunder; that is to say, each brush 31 and 33 delivers one positive wave to one live bar and one negative wave to the next live bar, and so on. These waves come from one line of the three-phase line. The brushes 32 and 34 are spaced 180 degrees apart and 90 degrees from the brushes 31 and 32. These brushes take off the waves from the commutator bars as they pass thereunder. The brush 32 delivers all of its waves to the positive side of the direct current line and the brush 34 delivers all of its waves to the negative side of the direct current line, or vice versa, as the case may be. In each of the commutators A, B, and C these brushes are numbered and lettered A, B and C, accordingly.

Between each two consecutive brushes is placed a condenser, which condensers are numbered 35, 36, 37 and 38. That is to say, each condenser is connected to an alternating current brush to one side and a direct current brush on the other side.

As shown in Figure 3, the three wires or lines of the three-phase circuit are indicated by the numerals 39, 40 and 41. When the commutator bar 9A is in circuit with the brush 31A, it is in circuit with the line 39, and the current will flow through this bar and through the cross connection to the bar 26, and out on the brush 34 to the direct current line 42. At this same instant the bar 24 in the commutator 9B is approaching the brush 31B, and the bar 18 in the commutator 9C has left the brush 31C.

It will be understood that the thickness of the live commutator bars is less than one-third of the dead space between the live commutator bars; that is to say, the live bars are approximately 18 degrees apart between centers, and the live bars are approximately 4½ degrees wide, and the dead space between the live bars is approximately 13½ degrees wide. In the rotation of the commutator, 36 degrees of the commutator will pass under the center of the brush during the time one complete cycle of the current is passing to or through the brush. The brush is preferably from 1½ to 2¼ degrees wide, more or less, and because of this the current can pass from the brush to the commutator through 6 degrees more or less of the rotation of the commutator, and the current is interrupted through 12 to 11¼ degrees, more or less, of the rotation of the commutator. The brushes make contact with the commutator, so that the crest of the wave will pass and the ends of the wave will be cut off. These crests of the wave are placed on the direct current line either end to end or, preferably, with the ends overlapping to some small extent. If the waves are placed on the line end to end it will make a resulting curve of electromotive force substantially the same as is shown at the right hand end of Figure 4 of the drawings.

It will also be understood that while the width of the live bars are preferably 4½ degrees, they may be of greater or less width within considerable limits as the manufacturer may elect or the circumstances may require.

The amplitude of the undulation is controlled by the variation in the width of the segments of the commutator and each wave is superimposed on the other at the lowest point of the waves usable—E. M. F., deducted mathematically by the rule of the $I^2R$ law and shown more specifically in the accompanying drawings. The dead space between the live bars may be filled in entirely by insulation, or by dead metal bars which are separated from the live bars by layers of mica or other suitable insulation.

The brush 31A takes current from the line 39 and delivers it alternately to the line 42 and 43. The brush 31B takes current from the line 40 and delivers it alternately to the line 42 and 43. The brush 31C takes current from the line 41 and delivers it alternately to the line 42 and 43. It will also be seen that the brush 33A at the bottom of the commutator 9A is connected to the A. C. circuit 40, the brush 33B is connected to the A. C. circuit 41, and the brush 33C is connected to the A. C. circuit 39.

When the bar 30 makes contact with the brush 31A, it will deliver current to the bar 15 and brush 32A, which in turn will deliver current to the opposite side 43 of the direct current line. In like manner, the corresponding bars in the other commutators will deliver current alternately to the brushes 34B and 32B, and the brushes 34C and the brushes 32C.

It will also be understood that the brushes at the top and bottom of each commutator receive alternating current and deliver it to the commutator bars, and the intermediate brushes on the sides of the commutator alternately receive the rectified current and deliver it rectified to the direct current line.

Between each of the alternating current brushes and the direct current brushes the condensers 35, 36, 37 and 38 are placed. These condensers take up the spark that might occur due to any mechanical imperfections. One side of the condenser is connected to a direct current brush and the other side of the condenser is connected to an alternating current brush.

Across the direct current circuit is placed the large capacitor 50, which capacitor is connected, by the circuits above described, with the direct current side of each of the condensers 35, 36, 37 and 38 placed between the brushes.

As shown in Figure 2, on the switchboard is provided the synchronizing lamps 51, 52 and 53. These lamps are suitably connected across the three-phase lines carrying the A. C. current which is to be converted into direct current, and which A. C. three-phase current drives the synchronizing motor 1. When these lamps go out, the three-pole knife switch 54 is thrown to close the circuits which conduct the current into the commutators, it being understood that the motor 1 has first been started and has gotten up to full speed, and is driving the commutators at synchronous speed. If the commutators are out of step, a current will flow through the lamps and the lamps will light up. The brushes are carried on brush rocker frames 55, which can be adjusted angularly, and when in the correct position the lamps 51, 52 and 53 will go out, and then the switch 54 can be closed. This is believed to be sufficiently illustrated and described for the purpose of this invention.

At 56 I have indicated a no-load relay, which automatically opens and breaks the three-phase circuit if for any reason the power is shut off, and, if the switch remained closed and the power came on again, it might be of the reverse polarity on the direct current line.

At 57 I have indicated a reverse current relay switch on the direct current line, which will open the direct current circuit if, for any reason, the direction of the current is reversed.

In Figures 1 and 2 I have shown volt meters for the three phases of the alternating current circuit, and I have shown an ampere meter and a volt meter for the direct current circuit.

I will assume that the synchronous motor that drives these commutators has a speed of 1800 R. P. M., or 30 revolutions per second, and that the current used is a 60 cycle current. The gear reduction reduces the angular velocity of the commutators to one-fifth of 30 revolutions per second, or turns the commutators at the rate of six revolutions per second, and to synchronize the commutators with the power line I provide twenty live bars on the commutator, or twenty live bars and twenty dead bars in all, so that 120 live bars pass under each brush per second.

It will also be understood that while the assembly is shown adapted to a 60 cycle current, it is also adaptable to an alternating current of any other cycle.

In superimposing the waves as shown in this invention there can be no interruptions in the E. M. F. on the D. C. line. Consequently there can be no explosive forces of a counter E. M. F. surging into the D. C. line from an inductive load, as it would do with a mechanical rectifier that manufactures an undulating interrupted unidirectional current.

Further, and as an additional part of this invention and for the purpose of eliminating any possible hazard that might intercept the D. C. lines, such as a spark at the brushes, poor commutation, open circuit, etc. that might develop on any mechanical device, which in this instance might create a gap or pulsation that would allow a flash on the commutator from the C. E. M. F. generated by an inductive D. C. load that would be construed as poor commutation, I have made it an object herewith to set forth the capacitor circuit which I have shown in the drawings, which will completely neutralize any C. E. M. F. that might surge into the D. C. line under the above-mentioned conditions.

To further eliminate a possible hazard of a counter E. M. F. and to make any D. C. device using this converter on a heavy current draw, such as an elevator motor, printing press motors, welding outfits, etc., I have as a further object of my invention, utilized a commutator with 20 live bars and 20 dead bars using 10 cross bar connections revolving at the 60 cycle synchronous speed of a 20 pole motor, viz., 360 R. P. M., and obtain said 360 R. P. M. on commutators by using a 4 pole 1800 R. P. M.—(60 cycle) synchronous motor, driving through a five to one reduction gear.

The effect of the above is to utilize such standard equipment as a 4 pole motor and of a smaller size than would be necessary for commutators driven with the same angular velocity as the motor and with the same D. C. load, although the size of the A. C. synchronous motor need only be sufficient to bring itself up to synchronism, against the windage, and friction of the brushes, etc., as the D. C. load has no bearing on the synchronous motor. Also the 20 live and 20 dead bar commutator has a circumference that not only better enables the manufacturer to produce a commutator of the proper carrying capacity, but gives better commutation and materially reduces the angle or arc with which the brushes are set to the peak of the right wave.

The commutators must each have as many live and as many dead bars as the synchronous motor has poles (that determine the speed), or the equivalent of motor poles that would produce the speed arrived at through the gear reduction. The cross bar connections are in accordance with the number of poles in the synchronous motor, or the equivalent of poles in the reduced speed through the gears as shown in the drawings and, for example, viz., at 60 cycle a 20 pole motor has 360 R. P. M. and there are 7200 alternations per minute in the current in the single phase and 21,600 in the three-phase, thus with 20 live bars in the commutator and 20 dead bars (as separators) and 10 cross bar connections, the brushes deliver in one direction, 120 alternations per second or 7200 per minute single phase, and 360 per second and 21,600 per minute in three phase.

A speed of 360 R. P. M. is the equivalent of a 20 pole 60 cycle synchronous motor and is one-fifth the speed of a 4 pole motor; therefore, it takes 20 live bars and 20 dead bars, with 10 cross bar connections on a 20 pole motor, or a 20 bar commutator, to produce a delivery of current in one direction at the rate of 20 alternations per revolution—120 per second and 7200 per minute on one phase, 360 per second or 21,600 per minute on three phase. Thus, by using the peak of 21,600 superimposed waves per minute from one superimposed position to another superimposed position, I get a constant potential equal to that of a D. C. dynamo, as shown by the drawings.

There are four brushes on each commutator, two A. C. brushes placed diametrically opposite and two D. C. brushes diametrically opposite and 90 degrees from the A. C. brushes.

The A. C. goes direct to the D. C. line through the cross connections of the commutator which reverse in synchronism with the frequency of the A. C. and always deliver the current in one direction on the D. C. line of substantially the same voltage, and it is also understood that the A. C., for different voltage requirements, be passed through a transformer for the specific purpose.

As a part of this device, I show in the drawings a simplified reverse current relay which would be specifically designed to fit particular cases, the capacity of which is determined by the current demand, for the protection of user requiring one direction polarization, and should there be an interference in the power supply, it will open the D. C. circuit and avoid any reverse current hazard.

As a part of this device, I also show in the drawings, a no-load relay and synchronizer for the A. C. circuit, which would be specifically designed to fit particular cases, the object of which is to open the A. C. circuit in the event there is a shut down on the A. C. lines.

It will also be understood that while transformers may be used to change the voltage of the A. C., there are no transformers or condensers used to rectify the current, thereby materially increasing the efficiency.

It will also be understood that the foremost and major factor in this invention is, that it utilizes all three or more phases of the A. C. in such a manner that the load is perfectly balanced on all three or more phases of the A. C. lines and that the waves are so superimposed that it utilizes the peak voltages, thereby maintaining substantially the same D. C. voltage as the input of A. C. voltage with a similar result on the power curve, and there are no interruptions in the D. C. line and consequently no surge of a counter E. M. F.

It will also be understood that this assembly can be reversed in its operation, that is to say, it can be used to take in direct current and give out single phase or three-phase A. C., as may be desired.

I claim:

1. In a converter, a rotating commutator having twenty bars suitably spaced apart and insulated from each other, the bars being spaced apart from each other at least twice the thickness of the bars.

2. In a converter, a rotating commutator having twenty bars suitably spaced apart and insulated from each other, the bars being spaced apart from each other at least twice the thickness of the bars, brushes making contact with said commutator, said brushes having a thickness of about one-half the thickness of the bars.

3. In a converter, a rotating commutator having twenty bars suitably spaced apart and insulated from each other, brushes conveying alternating current to said commutator, brushes taking direct current away from the commutator, the bars being spaced apart more than twice the thickness of the bars and being adapted to take from the alternating current brushes the intermediate part of each alternating current wave and feed it to the direct current brushes, cross-connections between the bars by which the current is conducted from one bar to another and from the alternating current brushes to the direct current brushes.

4. In a converter, a rotating commutator having twenty bars suitably spaced apart and insulated from each other, brushes conveying alternating current to said commutator, brushes taking direct current away from the commutator, the bars being spaced apart more than twice the thickness of the bars and being adapted to take from the alternating current brushes the intermediate part of each alternating current wave and feed it to the direct current brushes, cross-connections between the bars by which the current is conducted from one bar to another and from the alternating current brushes to the direct current brushes, condensers connected between the alternating current brushes and the direct current brushes.

5. In a converter, three rotating commutators mounted on the same shaft and driven thereby, each commutator having a series of live bars suitably spaced apart and insulated from each other, a line of three wires carrying between them a three-phase alternating current, alternating current brushes on each commutator, the alternating current brushes on one commutator being connected to one of said lines, the alternating current brushes on another commutator being connected to the second line, and the alternating current brushes on the third commuator being connected to the third line, the live bars on each commutator being suitably spaced apart and making contact with the alternating current brush long enough to permit only the intermediate portion of each alternating current wave to pass from the brush to the bar, cross-connections between the live bars, direct current brushes taking direct current from the bars, a direct current line to which said brushes are connected, a condenser connected between each alternating current brush and each direct current brush, a capacitor connected across the direct current line.

6. In a converter, a rotating commutator having a large number of live bars suitably spaced apart and insulated from each other, the live bars being spaced apart from each other by insulation at least twice the thickness of the bars, alternating current and direct current brushes making contact with said commutator bars, said brushes having a thickness that is less than the thickness of the bars, cross-connections from each bar to a bar remote therefrom by which the current is conducted from one bar to another and from an alternating current brush to a direct current brush.

7. In a converter, a rotating commutator having a large number of live bars suitably spaced apart and insulated from each other, the live bars being spaced apart from each other by insulation thicker than the thickness of the bars, alternating current and direct current brushes making contact with said commutator bars, cross-connections from each bar to a bar remote therefrom by which the current is conducted from one bar to another bar remote therefrom and from an alternating current brush to a direct current brush.

8. In a converter, a rotating commutator having a large number of live bars suitably spaced apart and insulated from each other, the live bars being spaced apart from each other by insulation thicker than the thickness of the bars, alternating current and direct current brushes making contact wtih said commutator bars, cross-connections from each bar to a bar remote therefrom by which the current is conducted from one bar to another bar remote therefrom and from an alternating current brush to a direct current brush, the jumping of the current from one live bar to a wrong live bar being prevented by the distance between the bars.

9. In a converter, a rotating commutator having a large number of live bars suitably spaced apart and insulated from each other, the live bars being spaced apart from each other by insulation thicker than the thickness of the bars, alternating current and direct current brushes making contact with said commutator bars, cross-connections from each bar to a bar remote therefrom by which the current is conducted from one bar to another bar remote therefrom and from an alternating current brush to a direct current brush, but four bars being electrically connected together at any one instant.

HAROLD N. LANDON.